UNITED STATES PATENT OFFICE.

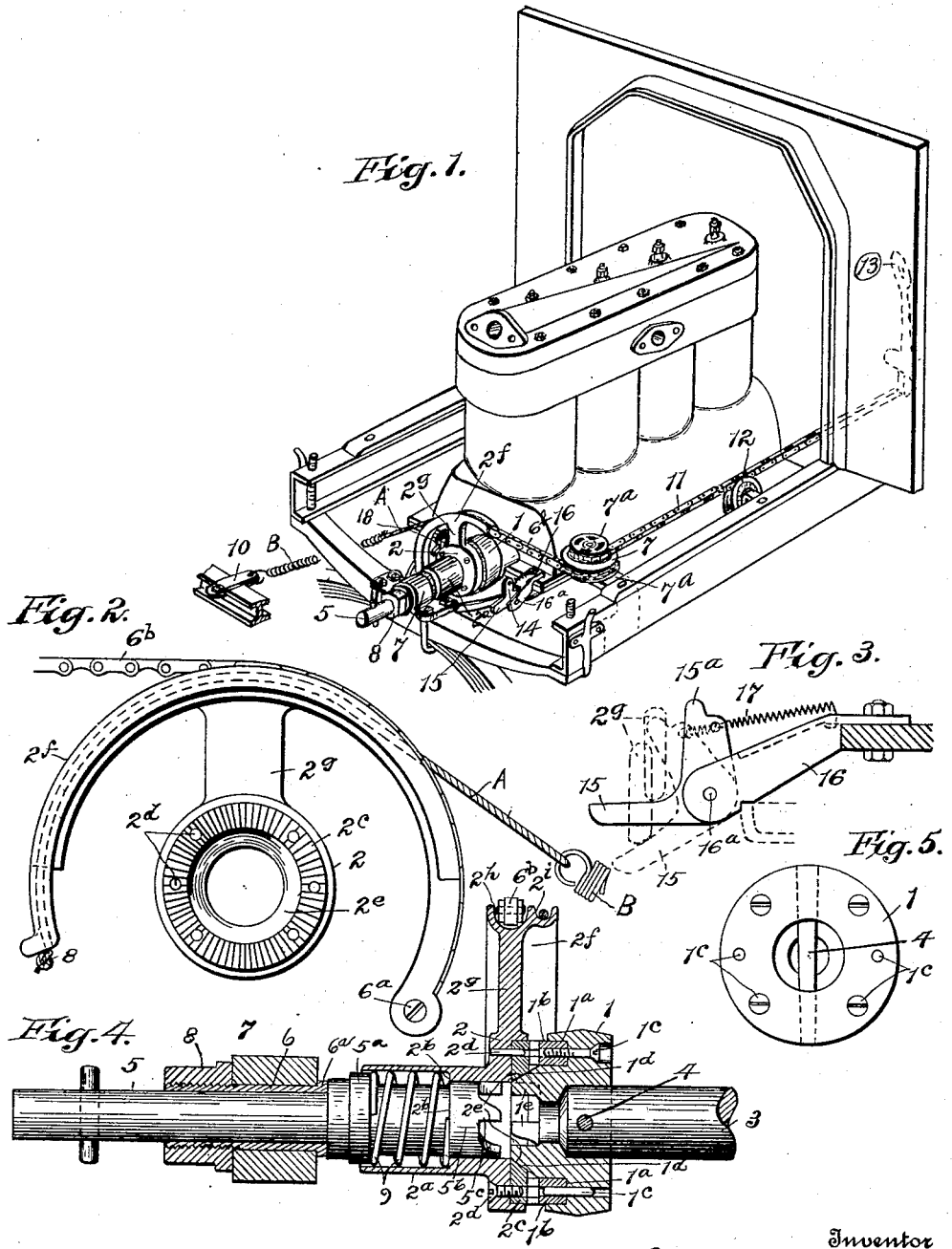

WILLIAM L. VANCE, OF CLEVELAND, OHIO.

MOTOR-STARTING DEVICE.

1,177,742.   Specification of Letters Patent.   Patented Apr. 4, 1916.

Application filed May 3, 1915. Serial No. 25,350.

*To all whom it may concern:*

Be it known that I, WILLIAM L. VANCE, a citizen of the United States, residing at Cleveland, in the county of Cuyahoga and State of Ohio, have invented certain new and useful Improvements in Motor-Starting Devices, of which the following is a specification.

My invention relates to improvements in motor starting devices, and more particularly to what are known as "self-starters", such as are commonly employed in connection with motor vehicles such as automobiles, motor trucks, and the like, the primary objects being to provide a generally improved purely mechanical self-starter of this class which will be exceedingly simple in construction, cheap of manufacture, and efficient in use.

A still further object is the provision of an improved device of this class which may be readily and conveniently attached to the crank shaft of any ordinary motor vehicle or automobile, and which when so attached may be conveniently and easily operated or manipulated by means of a foot lever whereby any desired and successive working strokes or impulses may be given successively to the actuating clutch member of the device should the first working impulse or stroke not prove effective in starting the engine.

A still further object is the provision of improved clutch and clutch actuating mechanism having improved self-centering bearings whereby the parts are held in true axial alinement at all times, and the liability to wear or disarrangement or breakage to the parts is reduced to a minimum.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1, is a perspective view of the improved starter as applied to an automobile, the hood and radiator being removed for the purpose of clearer illustration of the parts. Fig. 2, a rear view of the shaft actuating clutch segment detached. Fig. 3, a detail view of the actuating clutch segment releasing device or throw-off member for releasing or disengaging the actuating clutch member at the end of its working stroke or impulse. Fig. 4, a longitudinal sectional view of the same, the ordinary crank actuating shaft and the engine crank shaft being shown in side elevation. Fig. 5, a rear view of the pulley clutch member detached from the crank shaft.

Similar numerals of reference designate like parts throughout all the figures of the drawings.

The improved starter comprises a fixed or pulley clutch member 1, and a movable or actuating clutch member 2, the fixed clutch 1, being suitably secured or keyed upon the end of the crank shaft 3, of the motor or engine, as for example, by means of a cross pin 4. The movable or actuating clutch 2, is circumferentially and longitudinally movable on a second or bearing shaft 5, the latter being mounted in a removable bushing 6, mounted in a bearing 7, and held in the latter by means of a threaded nut 8, coöperating with a shoulder 6$^a$, of the bushing 6. The actuating clutch 2, is resisted in its longitudinal movements on the shaft 5, through the medium of a coiled spring 9, surrounding the bearing shaft 5, one end of said coiled spring abutting against an annular shoulder 5$^a$, of the shaft and the other abutting against an annular shoulder 2$^b$, within a bearing sleeve 2$^a$, of the clutch 2, said sleeve 2$^a$, bearing upon the head 5$^a$, of the shaft 5, and extending over and covering the spring 9.

The clutch member 1, is provided at one side with an annular recess 1$^a$, to receive and contain a toothed ring 1$^b$, removably mounted in the recess 1$^a$, by means of screws or securing elements 1$^c$, and the adjacent face side of the actuating clutch member 2, is provided with a coöperating toothed ring 2$^c$, held in place by similar securing elements 2$^d$.

As a means of maintaining the clutch members 1 and 2, and the shafts 3 and 5 in true longitudinal or axial alinement with each other at all times and thereby reducing the liability to extreme wear or displacement of the parts to a minimum the clutch member 1, is provided with a conical shaped bearing head 1$^d$, adapted to fit or be seated within a similarly shaped annular bearing or beveled portion 2ᵉ, of the toothed ring 2ᶜ, it being apparent however that such annular or beveled bearing portion 2ᵃ, might be formed directly in the clutch member 2, instead of in the toothed ring 2ᶜ.

As a means of actuating the clutch member 2, the latter is provided with an actuating rim or segment 2ᶠ, carried upon an arm 2ᵍ, said rim or segment 2ᶠ, being provided with a chain receiving clutch 2ʰ, and a cable receiving clutch 2ⁱ.

The actuating chain 6ᵇ, is suitably secured at one end of the rim or segment, as for example,—by means of an attaching screw or bolt 6ᶜ, the opposite end of said actuating chain extending over and being secured to a horizontally mounted pulley 7, mounted on a bracket or support 7ᵃ, and as a means of returning the actuating rim or segment to its initial position after each working stroke or impulse a cable A, is provided, said cable extending outwardly and downwardly to one side and being provided with a spring B, suitably secured in a bracket 10, conveniently located for this purpose.

As a means of manually actuating the actuating chain 6ᵇ, and the rim or segment 2ᶠ, a second chain 11, is provided, said second chain 11, extending over and being secured to a smaller or stepped pulley portion 7ᵃ, formed integral with the pulley 7, and extending rearwardly over a supporting pulley 12, and being connected to a foot lever 13, suitably mounted within convenient reach of the driver or operator of the vehicle.

As a means of disengaging the clutch member 2, from the pulley clutch 1, at the end of each stroke or working impulse, or in other words—moving said clutch member 2, longitudinally so as to bring the toothed portion 2ᶜ, out of engagement with the toothed ring 1ᵇ, a clutch releasing device or throw-off member 14, is provided, said device or member 14, in the present instance, comprising a bell crank member consisting of an arm 15, and an arm 15ᵃ, mounted on a pivot 16ᵃ, carried in a supporting bracket 16, the arm 15ᵃ being connected to a spring 17, to return the arms 15 and 15ᵃ, to their normal position upon the return of the arm 2ᵍ, of the actuating rim or segment 2ᶠ, it being obvious that upon the forward or working impulse given to the rim or segment 2ᶠ, that the arm 2ᵍ, will come into contact with the arm 15, thereby bringing the second arm 15ᵃ, against the side of the arm 2ᵍ, and pushing the clutch member 2, out of engagement with the clutch member 1, and whereby upon release of pressure upon the foot lever 13, the rim or segment 2ᶠ, will be permitted to be returned to its initial position through the action of the spring B, connected to the cable A. A throw-off member 18, on the opposite side similar to the throw-off member 14, and operating in a similar manner is adapted on the return of the movable clutch to its initial position to hold such clutch out of engagement with the fixed clutch until again given a working impulse.

It will also be observed that the conical shaped bearing head 1ᵈ, of the clutch member 1, is provided with suitably inclined clutch teeth 1ᵉ, adapted to receive and coöperate with similarly inclined clutch teeth 5ᶜ, on the head of the bearing shaft 5, the outer end of said bearing shaft 5, being adapted to receive an ordinary crank for cranking the crank shaft 3, in the ordinary manner should any occasion so require. It should also be observed that the fixed pulley or clutch member 1, forms a pulley for carrying the belt over the fan pulley above (not shown) for transmitting motion to such fan at the rear of the radiator in the ordinary manner.

From the foregoing description, taken in connection with the accompanying drawings, the operation and advantages of my invention will be readily understood.

Having thus described one of the embodiments of my invention, what I claim and desire to secure by Letters Patent, is,—

1. A starting device, comprising crank and bearing shafts, fixed and movable clutch members mounted thereon, respectively, said fixed and movable clutch members being provided with self-centering bearing head and socket members, respectively, means for circumferentially actuating said movable clutch member, and means for automatically releasing the latter at the end of its working impulse.

2. A starting device, comprising crank and bearing shafts provided with fixed and loose clutch members, respectively, said fixed and loose clutch members being provided respectively with cooperating conical shaped bearing head and socket members, means for circumferentially moving said movable clutch member, independent means for releasing the latter at the end of its working impulse or stroke, and means for returning said clutch member to its initial position when so released.

3. In a starting device, the combination with a crank shaft provided with a fixed clutch member having a conical shaped head at one side and a toothed ring portion at the base of said head; of a longitudinally movable bearing shaft having clutch teeth adapted to be moved into and out of engagement with said fixed clutch, and a circumferentially and longitudinally movable actuating clutch on said bearing shaft provided with a conical shaped socket adapted to receive and contain said bearing head of said fixed clutch member, and an annular toothed portion surrounding said socket and adapted to engage and coöperate with the toothed portion of said fixed clutch member.

4. A starting device, comprising a crank shaft, a fixed clutch member thereon provided with a conical shaped bearing head, a bearing shaft in alinement with said crank member, a spring resisted actuating clutch member mounted on said bearing member and provided with an annular beveled bearing portion adapted to receive and coöperate with said conical shaped bearing head on said fixed clutch member, said actuating clutch being provided with an arm carrying an actuating rim or segment, flexible actuating members mounted on said rim or segment, one of which is provided with a spring and the other with a foot lever, and means for automatically shifting and releasing said actuating clutch member from said fixed clutch member at the end of its working stroke or impulse.

In testimony whereof I have affixed my signature in presence of two witnesses.

WM. L. VANCE.

Witnesses:
O. C. BILLMAN,
GEO. E. KRICKER.